Patented Sept. 12, 1950

2,521,793

UNITED STATES PATENT OFFICE 2,521,793

REMOVAL OF PYROGENS FROM AMINO ACID SOLUTIONS

Eugene E. Howe, Bound Brook, and Frederick W. Holly, Cranford, N. J., assignors to Merck & Co., Inc., Rahway, N. J., a corporation of New Jersey No Drawing. Application July 26, 1947, Serial 764,004

1 Claim. (Cl. 167—58)

This invention relates to the purification of amino acid solutions of the type intended for parenteral use in maintaining proper nitrogen balance in the body, and particularly to a new and advantageous process for removing pyrogens from such solutions.

When traces of pyrogens are present in solutions administered therapeutically by the parenteral route, they produce toxic effects evidenced by a more or less serious rise in temperature. It is evident, therefore, that in cases of severe injury, post-operative shock, damage to the alimentary canal and the like, where parenteral administration of amino acids is indicated, the generally weakened condition of the patient makes it of primary importance to eliminate pyrogens from the amino acid solutions. The importance of pyrogen removal has been reflected in Federal regulations setting a limit on pyrogen content in preparation of this nature.

Recent improvements in amino acid solutions for parenteral use, particularly in providing solutions which are essentially free of physiologically inactive isomers of the essential amino acids and free of dicarboxylic acids, have been disclosed in a pending joint application by one of us, Howe and Tishler, Serial No. 637,498, filed December 27, 1945, now U. S. Patent 2,457,820, dated January 4, 1949. The new amino acid solutions are markedly superior to previously known amino acid preparations as evidenced by the low toxicity permitting infusion at rates 7 to 15 times faster than with acid or enzymatic protein hydrolyzates and about 5 times faster than with the synthetic amino acid mixture of Madden et al. (J. Exptl. Med. 79, 607–624 (1944), without producing vomiting.

The new amino acid solutions of Howe and Tishler have the further advantage of being readily and economically prepared. One factor which has interfered somewhat with quantity production of the amino acid solutions, however, has been the physical and mechanical delay in pyrogen removal and sterilization. Pyrogens have been removed by treating with activated charcoal. This procedure works well with small quantities of solution but becomes increasingly more cumbersome as the scale of production increases, and the sterilization must necessarily be carried out as a separate step.

It has now been discovered that amino acid solutions for parenteral use can be made pyrogen free by autoclaving at 120° C. for two to three hours, i. e. heating for two to three hours under about 15 lbs. steam pressure. This procedure not only eliminates the cumbersome filtrations previously required but has the further advantage of effecting simultaneous sterilization.

It is to be understood that as used throughout the specification and claim "pyrogen free" does not necessarily mean absolute freedom from pyrogenic materials, but that the concentration of such materials is sufficiently low so that there is not more than a 0.6° C. rise in temperature when a standardized quantity of the solution is injected into test animals under standardized conditions. This is a U. S. P. test outlined in The Pharmacopoeia of the United States, Thirteenth Revision (1947) page 679.

It is surprising to find that extending the sterilization period, normally thirty minutes at 120° C., and heating instead for a period of two to three hours, effects removal of pyrogens, since heating pyrogenic water alone in an autoclave at 120° C. does not appreciably reduce the pyrogen content even if heating is continued for ten hours. It is hypothesized that pyrogens, which are polysaccharide in nature, may react irreversibly with the amino acids, this process being very rapid at high temperature but occurring very slowly in the cold. We do not wish to be bound by this hypothesis, although it would account for the occasional disappearance of pyrogens from amino acid solutions on long standing, which has previously been ascribed to adsorption on glass.

The extended autoclaving to remove pyrogens in accordance with the present invention causes no objectionable side reactions. Heating for even as long as twenty-four hours does not cause decomposition or racimization of any of the amino acids provided that they are protected by an atmosphere of nitrogen. No histamine or other toxic effects are produced, and solutions treated for pyrogen removal and sterilization by the new procedure appear to be fully as well tolerated as solutions treated by the previous cumbersome procedures.

The time of autoclaving at 120° C. under steam pressure is critical in the sense that a minimum of two hours heating is required. This time is sufficient to substantially eliminate pyrogens, although heating for about three hours is preferred to insure complete removal of pyrogens. Longer heating is not detrimental, but at the same time provides no further advantage and hence is impractical.

In carrying out the process of the present invention, an amino acid solution, completely prepared except for final subdivision, pyrogen removal and sterilization, is preferably first subdivided into suitable containers, intended as units for distribution. Nitrogen is then passed through the solution for about five minutes to remove oxygen and the containers are sealed. The sealed containers are then placed in an autoclave and heated for three hours at 120° C. under steam pressure. This procedure has numerous advantages in addition to assuring removal of pyrogens. It is the ultimate in simplicity and brevity; no sterile equipment or sterile technique is required; and no pyrogen-free water or pyrogen-free equipment is required.

Alternatively, the amino acid solution can be autoclaved in bulk, after removal of oxygen therefrom, for three hours to effect pyrogen removal, subjected to a final filtration using pyrogen-free equipment, subdivided into suitable containers and sterilized by autoclaving, after sealing of the containers, for about thirty minutes. While this alternate procedure does not have all of the advantages of the preferred procedure above-mentioned, it is far superior to previously known methods of removing pyrogens from amino acid solutions. It has the further advantage, however, of removing any traces of color or turbidity in the final filtration step.

The new procedure for pyrogen removal works well not only with the amino acid preparations of Howe and Tishler, but also with the wholly synthetic amino acid mixture of Madden et al. and with acid protein hydrolyzates. In view of the marked superiority of the Howe and Tishler preparations, however, it is evident that the practical adaptation of the new procedure is of particular importance in the treatment of such amino acid preparations.

The following examples show how the removal of pyrogens can be carried out in accordance with the present invention, but it is to be understood that these examples are given by way of illustration and not of limitation.

*Example I*

By the procedure of Howe and Tishler, Serial No. 637,498, an amino acid solution containing 8% solids was prepared in which the solid components included natural essential amino acids in the following amounts (on the dry basis):

| | Per cent |
|---|---|
| Arginine | 6.6 |
| Histidine | 3.0 |
| Isoleucine | 5.4 |
| Leucine | 17.5 |
| Lysine | 9.8 |
| Methionine | 6.2 |
| Phenylalanine | 8.7 |
| Threonine | 5.4 |
| Tryptophane | 0.9 |
| Valine | 6.1 | and in which the essential amino acids in inactive form were present in the amount of 5% (on the dry basis). This solution had a pH of approximately 6.7. To aliquots of the pyrogen-free solution and to corresponding samples of pyrogen-free water were added equivalent amounts of a pyrogen standard (water of ascertained pyrogen content).

Triplicate samples of these preparations were autoclaved under steam pressure at 120° C. for one and three hours and tested for pyrogen content (measured in °F. temperature rise in the rabbit). The results obtained are tabulated below:

| Sample | Autoclaved | Temperature Rise | | |
|---|---|---|---|---|
| Amino acid and pyrogens | 1 hr | 0.7 | 0.8 | 0.6 |
| Water and pyrogens | do | 0.8 | 1.6 | 2.0 |
| Amino acids and pyrogens | 3 hrs | 0.2 | 0.0 | 0.2 |
| Water and pyrogens | do | 1.4 | 1.3 | 1.2 |

*Example II*

An amino acid solution was prepared according to the disclosure of Madden et al. (J. Exptl. Med. 79, 607–24 (June 1944)) containing 8% solids, in which the solid components included natural essential amino acids in the following amounts (on a dry basis).

| | Per cent |
|---|---|
| Arginine | 6.6 |
| Histidine | 3.0 |
| Isoleucine | 5.4 |
| Leucine | 15.4 |
| Lysine | 9.8 |
| Methionine | 3.1 |
| Phenylalanine | 3.5 |
| Threonine | 5.4 |
| Tryptophane | 0.9 |
| Valine | 6.9 | and in which the essential amino acids in inactive form were present in the amount of 25% (on the dry basis). This solution had a pH of approximately 6.6

Quantities of this solution were adjusted to uniform pyrogen content, and autoclaved under steam pressure for three hours. These samples and control samples having the same pyrogen content, but not autoclaved were tested for pyrogenicity as measured by temperature rise in the rabbit giving the following results:

| Sample | Temperature Rise | | |
|---|---|---|---|
| Amino acids and pyrogens (autoclaved) | 0.2 | 0.4 | 0.4 |
| Amino acids and pyrogens (control) | 0.8 | 0.8 | 0.6 |

*Example III*

A number of samples of amino acid solutions prepared as in Example I and of water were adjusted by addition of a mixed pyrogen standard to contain 10 M. P. D. in 1 cc. of solution (i. e. 10 times the minimum pyrogenic dose in each cc. of solution). (For the definition of a Minimum Pyrogenic Dose see Molitor, Gaindel, Kuna, and Ott, J. Am. Pharm. Assoc. 35, 356 (1946).) Other samples were adjusted to contain pyrogens in the amount of 10 M. P. D. in 10 cc. of solution.

These samples were autoclaved under steam pressure at 120° C. for different periods of time and tested for pyrogenicity in the rabbit giving the following results:

| Sample Mixed pyrogens in— | Time of Autoclaving | Dosage/kgm. | Pyrogenicity |
|---|---|---|---|
| | Hours | | |
| Water | 0 | 10 M. P. D. in 1 cc. sol'n | Markedly pyrogenic. |
| Do | 1 | do | Moderately pyrogenic. |
| Do | 3 | do | Do. |
| Do | 10 | do | Do. |
| Amino acid solution | 3 | do | Passes U. S. P. Test. |
| Water | 3 | 10 M. P. D. in 10 cc. sol'n | Markedly pyrogenic. |
| Amino acid solution | 0 | do | Do. |
| Do | 1 | do | Do. |
| Do | 2 | do | Moderately pyrogenic. |
| Do | 3 | do | Passes U. S. P. Test. |

Example IV

An 8% amino acid solution prepared as described in Example I was made up with a pyrogen standard in such a way that it contained 1 M. P. D. per cc. 450 cc. of this solution was introduced into a 500 cc. serum bottle, nitrogen was passed into the solution for five minutes and the bottle was sealed. The sealed bottle containing the solution was then autoclaved at 120° C. for three hours. The solution thus treated passed the U. S. P. Test for pyrogens.

Example V

A batch of 180 liters of 8% amino acid solution, prepared as described in Example I was found to be heavily contaminated with pyrogens. This solution was treated with nitrogen to expel all oxygen and then autoclaved for three hours at 120° C. After chilling overnight a portion of the autoclaved solution was filtered through a bacterial filter, and subdivided into 500 cc. serum bottles under sterile conditions. The remainder was filtered through a sintered glass funnel, subdivided into 500 cc. serum bottles and autoclaved for thirty minutes. All samples of these solutions were found to pass the U. S. P. Test for pyrogens.

In the administration of amino acids solutions parenterally, it is customary to inject 500 cc. or more of solution at a time. In such large amounts it is important that the pH of the solution injected approximate as closely as possible that of the blood, i. e., pH 7.4. While a pH range of 4.5 to 8.0 is currently being considered for adoption into a U. S. P. Monograph for Protein Hydrolysate injection as a standard requirement for approved amino acids solutions for parenteral use, solutions are considered to be more satisfactory if the pH is held within the more restricted range of about 5.5 to 7.5.

Various changes and modifications in the procedures herein described can be made without departing from the spirit and scope of the present invention and we are to be limited by the appended claim.

We claim:

The process of preparing for parenteral injection an aqueous solution of the essential amino acids that comprises subjecting an oxygen-free aqueous solution of the essential amino acids, having an essentially neutral pH such that quantities of the order of 500 cc. can be safely injected parenterally, to autoclaving under steam pressure at a temperature of about 120° C. for approximately 2-3 hours, thereby simultaneously sterilizing said solution and removing pyrogens therefrom.

EUGENE E. HOWE.
FREDERICK W. HOLLY.

REFERENCES CITED

The following references are of record in the file of this patent:

UNITED STATES PATENTS

| Number | Name | Date |
|---|---|---|
| 2,241,927 | Sahyun | May 13, 1941 |
| 2,250,553 | Ruskin | July 29, 1941 |
| 2,432,970 | Pingert | Dec. 16, 1947 |
| 2,434,715 | Olcott | Jan. 20, 1948 |

OTHER REFERENCES

Banks, pages 260–291 (pages 279, 280, 290 specifically relied upon) American J. of Clinical Pathology, vol. 4 (1934).

Spalton, Mfg. Chemist and Mfg. Perfumer, Feb. 1947, pages 59–65.